(12) United States Patent
Kamikihara et al.

(10) Patent No.: US 10,479,221 B2
(45) Date of Patent: Nov. 19, 2019

(54) VEHICLE

(71) Applicant: Toyota Jidosha Kabushiki Kaisha, Toyota-shi Aichi-ken (JP)

(72) Inventors: Daisuke Kamikihara, Toyota (JP); Chiemi Tsunekawa, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 15 days.

(21) Appl. No.: 15/717,464

(22) Filed: Sep. 27, 2017

(65) Prior Publication Data

US 2018/0093584 A1 Apr. 5, 2018

(30) Foreign Application Priority Data

Oct. 3, 2016 (JP) ................. 2016-195547

(51) Int. Cl.
*B60L 53/12* (2019.01)
*B60K 6/40* (2007.10)
*H02J 1/10* (2006.01)
*H02J 7/00* (2006.01)
*B60L 53/14* (2019.01)
*B60L 50/60* (2019.01)
*H02J 50/10* (2016.01)

(52) U.S. Cl.
CPC ............. *B60L 53/12* (2019.02); *B60K 6/40* (2013.01); *B60L 50/66* (2019.02); *B60L 53/14* (2019.02); *H02J 1/10* (2013.01); *H02J 7/0027* (2013.01); *B60Y 2200/92* (2013.01); *B60Y 2300/91* (2013.01); *B60Y 2304/07* (2013.01); *B60Y 2400/112* (2013.01); *H02J 50/10* (2016.02); *Y02T 10/7005* (2013.01); *Y02T 10/705* (2013.01); *Y02T 10/7055* (2013.01); *Y02T 10/7072* (2013.01); *Y02T 90/122* (2013.01); *Y02T 90/14* (2013.01); *Y10S 903/951* (2013.01)

(58) Field of Classification Search
None
See application file for complete search history.

(56) References Cited

U.S. PATENT DOCUMENTS

| | | | |
|---|---|---|---|
| 7,741,734 B2 | 6/2010 | Joannopoulos et al. | |
| 9,878,628 B2 * | 1/2018 | Tsukamoto | H02J 5/005 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |

(Continued)

FOREIGN PATENT DOCUMENTS

| | | |
|---|---|---|
| AU | 2006269374 B2 | 10/2009 |
| AU | 2007349874 A2 | 1/2010 |

(Continued)

*Primary Examiner* — Daniel J Cavallari
(74) *Attorney, Agent, or Firm* — Dinsmore & Shohl LLP

(57) ABSTRACT

A vehicle includes: a battery; an inlet to which a charging connector provided external to the vehicle is connectable; a power receiving device configured to contactlessly receive power from a power transmitting device provided external to the vehicle; a connector electrically connected to the inlet and the power receiving device; and a connector electrically connected to the power receiving device and the battery. Power supplied to the inlet is supplied to the battery via the connector, the power receiving device, and the connector.

4 Claims, 8 Drawing Sheets

(56) References Cited

U.S. PATENT DOCUMENTS

| | | |
|---|---|---|
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2016/0046194 A1* | 2/2016 | Tsukamoto ............. H02J 5/005 307/104 |
| 2016/0052403 A1* | 2/2016 | Asai ......................... H02J 5/00 307/10.1 |
| 2018/0015833 A1* | 1/2018 | Namou ................. B60L 11/182 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 T | 1/2009 |
| JP | 2016-103612 A | 6/2016 |
| KR | 20080031398 A | 4/2008 |
| KR | 20100015954 A | 2/2010 |
| WO | 2007008646 A2 | 1/2007 |
| WO | 2008118178 A1 | 10/2008 |

* cited by examiner

VEHICLE

CROSS-REFERENCE TO RELATED APPLICATION

This application claims priority to Japanese Patent Application No. 2016-195547 filed on Oct. 3, 2016 the entire contents of which are hereby incorporated by reference.

BACKGROUND

Field

The present disclosure relates to a vehicle.

Description of the Background Art

There have been proposed various types of vehicles each capable of receiving power from an external power supply to charge an in-vehicle battery. A vehicle described in Japanese Patent Laying-Open No. 2016-103612 can contactlessly receive power from a power transmitting device provided external to the vehicle so as to charge an in-vehicle battery.

SUMMARY

Vehicles that can charge batteries with externally supplied power mainly include: a type of vehicle capable of contact charging; and a type of vehicle capable of contact charging and contactless charging.

The type of vehicle capable of contact charging includes a charging device for supplying a battery with power supplied via a charging connector external to the vehicle. The charging device supplies the battery with power supplied via the charging connector.

The type of vehicle capable of contact charging and contactless charging includes a charging device and a power receiving device. The power receiving device contactlessly receives power from an externally provided power transmitting device, and the power received by the power receiving device is supplied to the battery.

In recent years, the type of vehicle capable of contact charging has been pervasive. The type of vehicle capable of contact charging and contactless charging has not been pervasive yet but is expected to be pervasive in future.

Therefore, the following cases are considered: the power receiving device may be sold as an option that can be added by a purchaser when purchasing the type of vehicle capable of contact charging; and the power receiving device may be sold as a device that can be installed after purchasing the type of vehicle capable of contact charging.

Moreover, for maintenance of the power receiving device in the type of vehicle capable of contact charging and contactless charging, the power receiving device may be detached from the vehicle.

However, in the conventional type of vehicle capable of contact charging and contactless charging, the addition, post-installation, and detachment of the power receiving device are not taken into consideration at all. As a result, much time and effort are presumably required for the addition, post-installation, and detachment of the power receiving device, disadvantageously.

The present disclosure has been made in view of the above problem, and has an object to provide a vehicle that can facilitate addition, post-installation, and detachment of a power receiving device.

A vehicle according to the present disclosure includes a battery, an inlet, a power receiving device, a first connector, and a second connector. A charging connector provided external to the vehicle is connectable to the inlet. The power receiving device is configured to contactlessly receive power from a power transmitting device provided external to the vehicle. The first connector is electrically connected to the inlet and the power receiving device. The second connector is electrically connected to the power receiving device and the battery. Power supplied to the inlet is supplied to the battery via the first connector, the power receiving device, and the second connector.

According to the vehicle, by connecting the power receiving device to the first connector and the second connector, the power receiving device can be attached readily, whereby the vehicle having the power receiving device mounted thereon can be provided in a short time if the power receiving device is chosen as an option when purchasing the vehicle. For example, the power receiving device can be facilitated to be attached in a dealer of the vehicle rather than a production factory of the vehicle. Accordingly, the user's request can be handled promptly.

The vehicle according to the present disclosure further includes: a first side surface and a second side surface; a bottom surface; and a charging cable configured to electrically connect the second connector and the power receiving device. The battery is provided on the bottom surface. The inlet is provided in the first side surface. The charging cable is disposed to extend at the second side surface side relative to the battery.

When impact force is externally applied to the first side surface in the vehicle, the inlet may be damaged. On the other hand, the power receiving device is disposed at the bottom surface side of the vehicle, so that the power receiving device can be suppressed from being damaged. Further, since the charging cable is disposed to extend at the second side surface side relative to the battery, the charging cable is also suppressed from being damaged. Accordingly, the battery can be charged using the power receiving device.

The vehicle according to the present disclosure further includes: a first side surface and a second side surface; a bottom surface; an engine; and an exhaust pipe connected to the engine. The battery is provided on the bottom surface and the power receiving device is provided on a lower surface of the battery. The power receiving device includes: a first terminal electrically connected to the first connector; and a second terminal electrically connected to the first terminal and electrically connected to the second connector. The first terminal and the second terminal are provided on a circumferential surface of the power receiving device at a portion located at the first side surface side, and the exhaust pipe is disposed at the second side surface side relative to the battery.

According to the vehicle, the battery is disposed between the exhaust pipe and each of the first terminal and the second terminal, thereby suppressing heat of the exhaust pipe from reaching the first terminal and the second terminal. Moreover, when a cable is connected to the first terminal or the second terminal, the cable can be suppressed from being deteriorated by the heat from the exhaust pipe.

The vehicle according to the present disclosure further includes a bottom surface, a first buffer member, and a second buffer member. The battery is provided on the bottom surface. The power receiving device is provided on a lower surface of the battery. The first buffer member and the second buffer member are disposed on the lower surface of the battery. The first buffer member is disposed at a front side relative to the power receiving device and the second buffer member is disposed at a back side relative to the power receiving device.

According to the vehicle, even when the vehicle travels on a road surface with an obstacle thereon, the obstacle is brought into contact with the first buffer member or the second buffer member before the obstacle interferes with the power receiving device, thereby protecting the power receiving device.

The foregoing and other objects, features, aspects and advantages of the present disclosure will become more apparent from the following detailed description of the present disclosure when taken in conjunction with the accompanying drawings.

DETAILED DESCRIPTION

Figure 1:
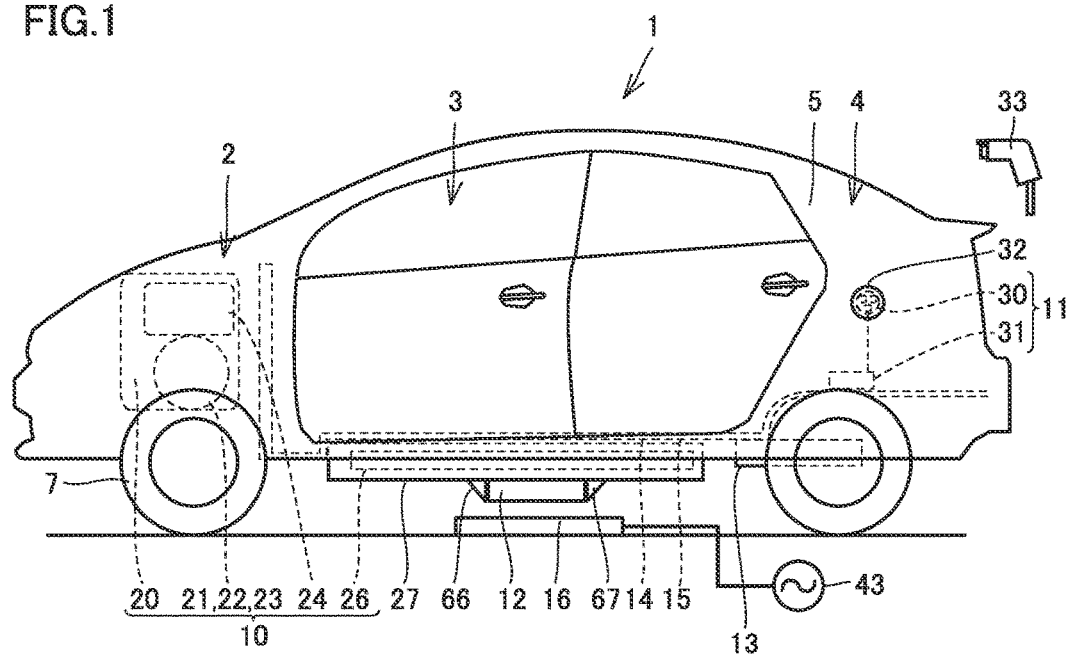
FIG. 1 is a side view schematically showing a vehicle 1.
Figure 1:
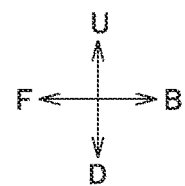

With reference to FIG. 1 to FIG. 8, the following describes an electrically powered vehicle according to the present embodiment. It should be noted that the same or substantially same configurations shown in FIG. 1 to FIG. 8 are given the same reference characters and may not be repeatedly described.

It should be noted that "U" shown in FIG. 1 and the like represents the upward direction and "D" represents the downward direction. "L" represents the leftward direction of the vehicle and "R" represents the rightward direction of the vehicle. "F" represents the frontward direction of the vehicle and "B" shows the backward direction of the vehicle.

First Embodiment

FIG. 1 is a side view schematically showing a vehicle 1. As shown in FIG. 1, vehicle 1 includes an engine compartment 2, a passenger compartment 3, and a luggage area 4.

In engine compartment 2, devices such as the engine are installed. Passenger compartment 3 is formed at the back side relative to engine compartment 2. Luggage area 4 is disposed at the back side relative to passenger compartment 3.

Vehicle 1 includes a driving device 10, a charging device 11, a power receiving device 12, a fuel tank 13, and a floor panel 14. Vehicle 1 is a vehicle capable of receiving power from a charging connector 33 using charging device 11 and capable of contactlessly receiving power from a power transmitting device 16 using power receiving device 12. Floor panel 14 is a member that constitutes a bottom surface 15 of vehicle 1.

Driving device 10 includes an engine 20, rotating electrical machines 21, 22, a power split device 23, a PCU (power control unit) 24, and a battery 26.

Engine 20, rotating electrical machines 21, 22, power split device 23, and PCU 24 are stored in engine compartment 2. Battery 26 is stored in a battery case 27, and battery case 27 is disposed on bottom surface 15.

Charging device 11 includes: an inlet 30 provided in a left side surface 5 of vehicle 1; and a rectifier 31 connected to inlet 30. A lid 32 is provided on left side surface 5 of vehicle 1. When lid 32 is opened, inlet 30 is exposed to outside. When inlet 30 is exposed to outside, charging connector 33 can be connected to inlet 30. Charging connector 33 is connected to a power supply (not shown). Rectifier 31 is stored in luggage area 4. Rectifier 31 converts AC power supplied from charging connector 33 into DC power, and supplies it to battery 26.

Power receiving device 12 is disposed on the lower surface of battery 26, and contactlessly receives power from power transmitting device 16 disposed on a ground surface or the like. The power received by power receiving device 12 is supplied to battery 26.

Vehicle 1 includes a buffer member 66 and a buffer member 67 both provided on the lower surface of battery case 27. Buffer member 66 is disposed at the front side relative to power receiving device 12 and buffer member 67 is disposed at the back side relative to power receiving device 12. Buffer member 66 and buffer member 67 are formed to project downward from the lower surface of battery case 27.

For example, when vehicle 1 moves forward toward a fallen object or the like on a road surface, buffer member 66 hits the fallen object prior to power receiving device 12, thus protecting power receiving device 12. When vehicle 1 moves backward toward the fallen object, buffer member 67 hits the fallen object prior to power receiving device 12, thus protecting power receiving device 12.

Figure 2:
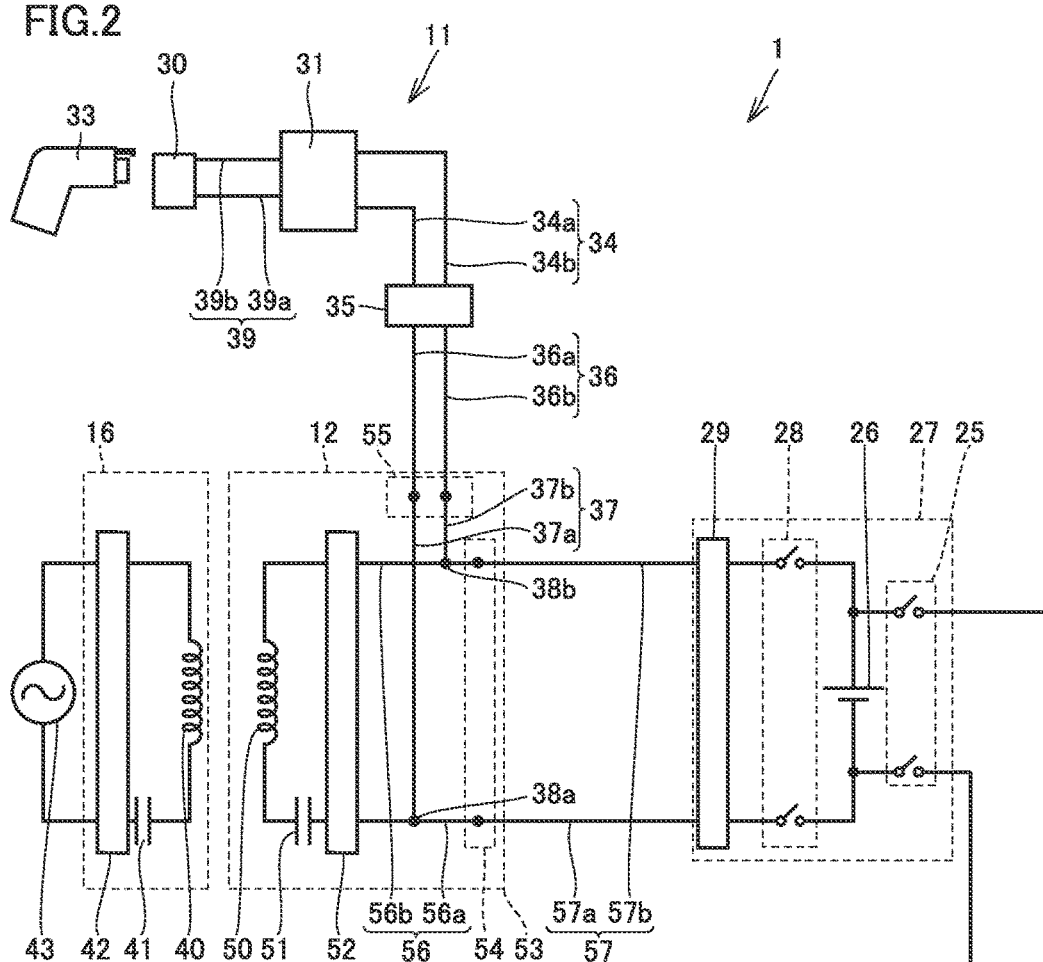
FIG. 2 is a block diagram showing vehicle 1.

FIG. 2 is a block diagram showing vehicle 1. As shown in this FIG. 2, driving device 10 includes a SMR (system main relay) 25 and a power line 19. Power line 19 includes an interconnection 19a and an interconnection 19b, and interconnection 19a and interconnection 19b are connected to PCU 24 and SMR 25. SMR 25, battery 26, and a charging relay 28 are stored in battery case 27. A second connector 29 is provided in battery case 27. The second connector 29 is connected to charging relay 28. Charging relay 28 is connected to battery 26.

SMR 25 includes: a relay connected to interconnection 19a and battery 26; and a relay connected to interconnection 19b and battery 26. When SMR 25 is turned on, PCU 24 is electrically connected to battery 26. When SMR 25 is turned off, PCU 24 is electrically disconnected from battery 26.

When SMR 25 is turned on to connect battery 26 to PCU 24, DC power is supplied from battery 26 to PCU 24. PCU 24 converts the supplied DC power into AC power, and supplies it to rotating electrical machine 22. Rotating electrical machine 22 drives wheels 7. Power split device 23 splits motive power from engine 20 to wheels 7 and rotating electrical machine 21. Rotating electrical machine 21 mainly functions as a power generator.

Power receiving device 12 is a device for contactlessly receiving power from power transmitting device 16 provided external to vehicle 1 so as to supply the power to battery 26. Power receiving device 12 includes a power receiving coil 50, a capacitor 51, a rectifier 52, a case 53, connection terminals 54, 55, a power line 56, and a power line 37. Power receiving coil 50, capacitor 51, rectifier 52, power line 56, and power line 37 are stored in case 53.

Capacitor 51 is connected to power receiving coil 50 in series, and an LC resonator is formed by power receiving coil 50 and capacitor 51. Power receiving coil 50 contactlessly receives power from power transmitting device 16.

Rectifier 52 is connected to power receiving coil 50 and capacitor 51, and power line 56 is connected to rectifier 52. Rectifier 52 converts, into DC, the AC received by power receiving coil 50. Power line 56 includes an interconnection 56a and an interconnection 56b, and interconnections 56a, 56b are connected to connection terminal 54 and rectifier 52.

A power line 57 is connected to connection terminal 54. Power line 57 includes an interconnection 57a and an interconnection 57b, and interconnection 57a and interconnection 57b are connected to connection terminal 54 and the second connector 29.

Power line 37 is connected to connection terminal 55, and power line 37 includes an interconnection 37a and an interconnection 37b. Interconnection 37a is connected to a node 38a of interconnection 56a, and interconnection 37b is connected to a node 38b of interconnection 56b. It should be noted that nodes 38a, 38b are located in case 53. Moreover, connection terminal 55 and connection terminal 54 are electrically connected by power line 37 and power line 56.

Power transmitting device 16 includes a power transmitting coil 40, a capacitor 41, and a converter 42. Capacitor 41 is connected to power transmitting coil 40 in series, and an LC resonator is formed by power transmitting coil 40 and capacitor 41.

When charging battery 26 using power receiving device 12, SMR 25 is off and charging relay 28 is on.

AC power is supplied from a power supply 43 to converter 42. Converter 42 adjusts voltage and frequency, and AC flows in power transmitting coil 40. The flow of the AC in power transmitting coil 40 causes formation of an electromagnetic field around power transmitting coil 40.

Power receiving coil 50 contactlessly receives power from power transmitting coil 40 via the electromagnetic field formed around power transmitting coil 40. The AC power received by power receiving coil 50 is converted into DC power by rectifier 52. The DC power output from rectifier 52 is supplied to battery 26 via power line 56, connection terminal 54, power line 57, the second connector 29, and charging relay 28.

Charging device 11 is a device for supplying battery 26 with power supplied from charging connector 33. Charging device 11 includes inlet 30, rectifier 31, a power line 39, and a power line 34 connected to rectifier 31. Power line 39 includes interconnections 39a, 39b, and interconnections 39a, 39b connects inlet 30 and rectifier 31. Rectifier 31 is supplied with AC power from inlet 30, converts it into DC power, and outputs it.

Power line 34 includes an interconnection 34a and an interconnection 34b, and interconnections 34a, 34b are connected to a first connector 35 and rectifier 31. A power line 36 is connected to the first connector 35 and includes an interconnection 36a and an interconnection 36b. Interconnection 36a and interconnection 36b are connected to connection terminal 55. Accordingly, the first connector 35 is electrically connected to inlet 30 via rectifier 31 and is electrically connected to connection terminal 55.

When charging battery 26 using charging device 11, charging relay 28 is on and SMR 25 is off.

Charging connector 33 is connected to inlet 30. Inlet 30 is supplied with AC power from charging connector 33. The AC power is supplied to rectifier 31 via inlet 30. Rectifier 31 converts the supplied AC power into DC power, and outputs it.

The output DC power is supplied to battery 26 via power line 34, the first connector 35, power line 36, connection terminal 55, nodes 38a, 38b, connection terminal 54, power line 57, the second connector 29, and charging relay 28. It should be noted that when the DC power from rectifier 31 passes through power receiving device 12, rectifier 52 is not operational, whereby current is suppressed from flowing in power receiving coil 50. As such, the DC power from rectifier 31 is output from connection terminal 54 via a portion of power receiving device 12.

Figure 3:
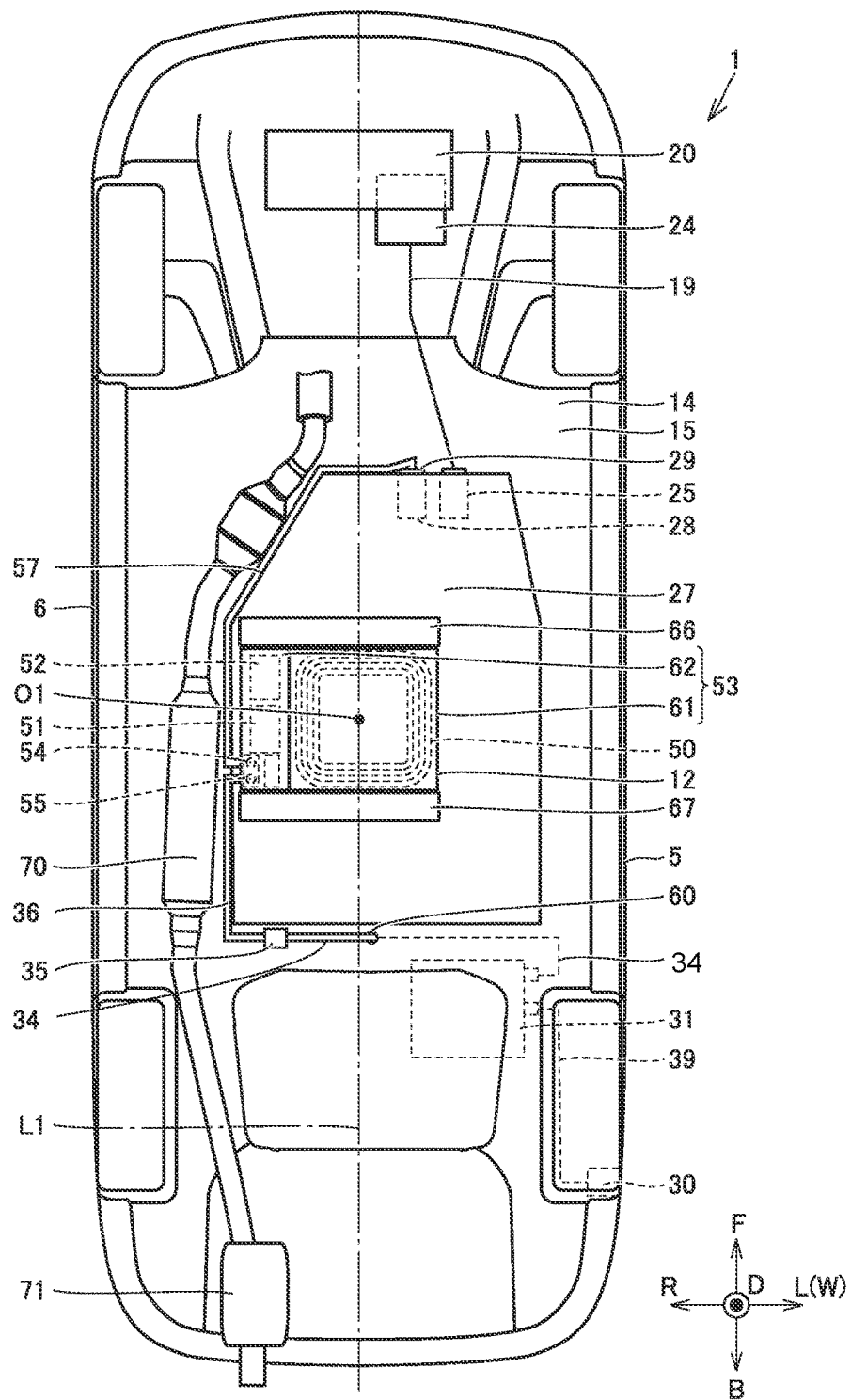
FIG. 3 is a bottom view showing vehicle 1.

FIG. 3 is a bottom view showing vehicle 1. As shown in FIG. 3, battery case 27 is disposed on bottom surface 15 of vehicle 1, and an exhaust pipe 70 is disposed at the right side surface 6 side relative to battery case 27. Exhaust pipe 70 is formed to extend in the forward/backward direction of vehicle 1. Exhaust pipe 70 has one end connected to engine 20, and has the other end connected to a muffler 71.

Inlet 30 is provided on left side surface 5, and is disposed at the back side relative to battery case 27. Rectifier 31 is disposed at the front side relative to inlet 30 and at the back side relative to battery case 27.

A hole 60 is formed in floor panel 14. Hole 60 is formed at the front side relative to rectifier 31, and at the back side relative to battery case 27.

Vehicle 1 includes a cable 44, a cable 45, and a cable 46. Cable 44 includes power line 34 and an insulating coating film that covers power line 34. Cable 45 includes power line 36, and an insulating coating film that covers the circumference of power line 36. Cable 46 includes power line 57, and an insulating coating film that covers the circumference of power line 57.

One end of cable 44 (power line 34) is connected to rectifier 31 in vehicle 1, and is drawn from the inside of vehicle 1 to bottom surface 15 of floor panel 14 via hole 60. The other end of cable 44 is connected to the first connector 35 disposed on bottom surface 15.

The first connector 35 is disposed at the back side relative to battery case 27. Cable 45 (power line 36) is connected to the first connector 35, extends along the right side surface of battery case 27, and is connected to connection terminal 55.

Connection terminal 55 and connection terminal 54 are formed on the circumferential surface of case 53 of power receiving device 12 at a portion located at the right side surface 6 side. Cable 46 (power line 57) is connected to connection terminal 54. Cable 46 is provided to be drawn from connection terminal 54 and extend along the right side surface of battery case 27. Moreover, cable 46 is provided to reach the front surface of battery case 27 and extend along the front surface of battery case 27.

The second connector 29 is provided on the front surface of battery case 27, and cable 46 is connected to the second connector 29. It should be noted that charging relay 28 is disposed at the front surface side of battery case 27, and the second connector 29 is connected to charging relay 28. SMR 25 is provided at the front surface side of battery case 27, and power line 19 connects PCU 24 and SMR 25.

Case 53 of power receiving device 12 includes a resin cover 61 and a metal cover 62. Resin cover 61 is provided to cover power receiving coil 50. Metal cover 62 is provided to cover capacitor 51, rectifier 52, and connection terminals 54, 55. Resin cover 61 is disposed at the left side surface 5 side relative to metal cover 62, and connection terminals 54, 55 are disposed at the right side surface 6 side relative to power receiving coil 50.

It should be noted that power receiving coil 50 is a spiral coil and is disposed to have a winding-axis line O1 directed in the upward/downward direction. Moreover, when power receiving coil 50 is viewed from below, power receiving coil 50 is provided to have winding-axis line O1 located at the center of vehicle 1 in the width direction of vehicle 1. Specifically, power receiving coil 50 is disposed such that winding-axis line O1 overlaps with a center line L1 extending through the center of vehicle 1 in the width direction of vehicle 1. Therefore, connection terminal 54 and connection terminal 55 located at the right side surface 6 side relative to power receiving coil 50 are provided at a location closer to right side surface 6 relative to left side surface 5.

Figure 4:
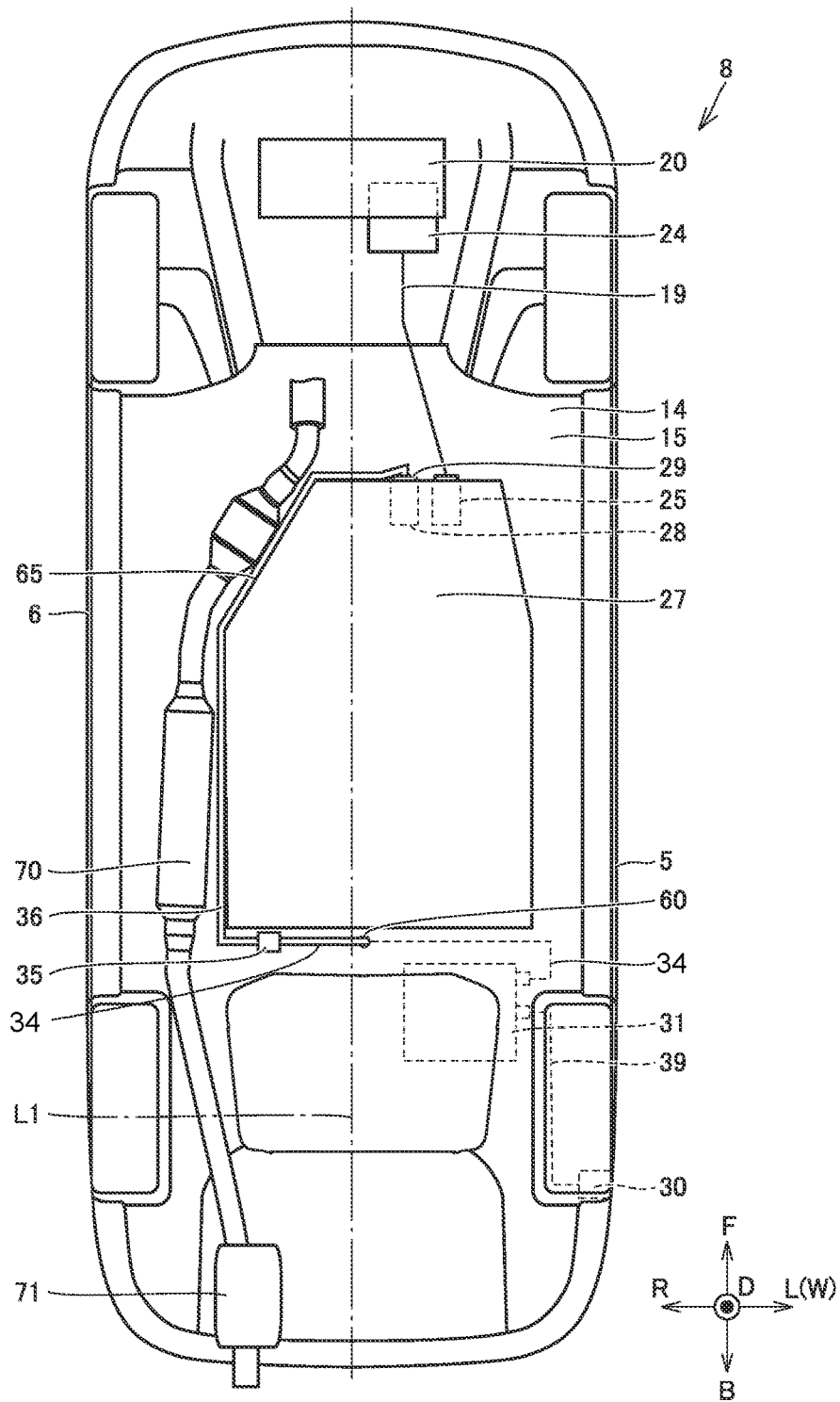
FIG. 4 is a bottom view showing a vehicle 8 in such a state that a power receiving device 12 and the like are detached from vehicle 1 shown in FIG. 3.
Figure 5:
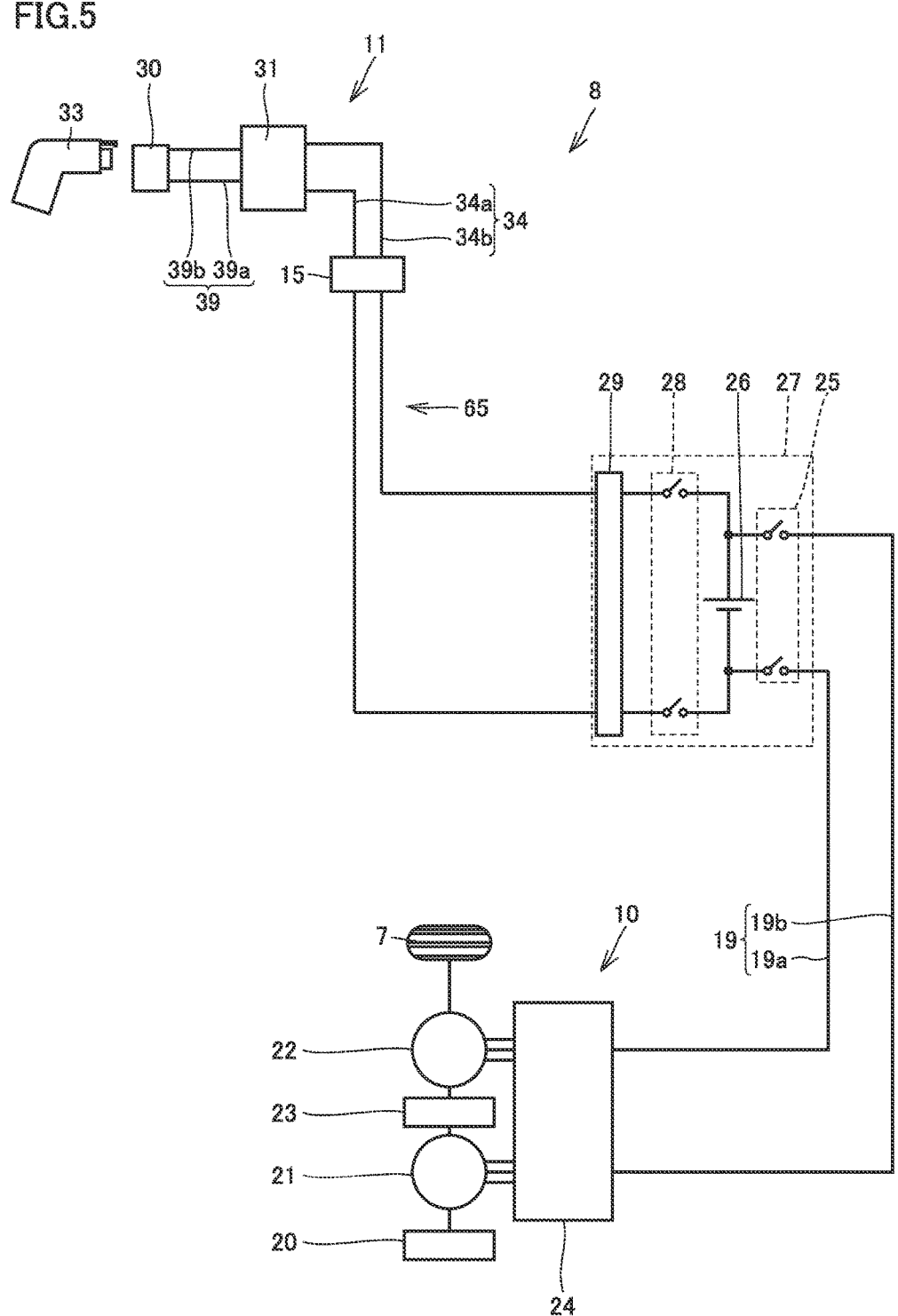
FIG. 5 is a block diagram showing vehicle 8 shown in FIG. 4.

FIG. 4 is a bottom view showing a vehicle 8 in such a state that power receiving device 12 and the like are detached from vehicle 1 shown in FIG. 3. FIG. 5 is a block diagram showing vehicle 8 shown in FIG. 4.

Vehicle 8 is constructed by detaching power receiving device 12 and cables 45, 46 (power lines 36, 57) from vehicle 1 shown in FIG. 3 and connecting a cable 65 to the first connector 35 and the second connector 29. In each of FIG. 4 and FIG. 5, vehicle 8 includes cable 65 that connects the first connector 35 and the second connector 29.

In this vehicle 8, the AC supplied to inlet 30 is converted by rectifier 31 into DC power. The DC output from rectifier 31 is supplied to battery 26 via cable 44, the first connector 35, cable 65, the second connector 29, and charging relay 28. Thus, vehicle 8 can charge battery 26 using charging device 11.

Vehicle 1 shown in FIG. 3 is constructed by: detaching cable 65 from vehicle 8 shown in FIG. 4; disposing power receiving device 12 on the lower surface of battery case 27; connecting cable 45 to the first connector 35 and connection terminal 55; and connecting cable 46 to connection terminal 54 and the second connector 29.

Thus, in the plug-in vehicle according to the present embodiment, power receiving device 12 can be readily attached.

Therefore, when vehicle 8 is prepared beforehand and a purchaser wishes to purchase vehicle 8, vehicle 8 is provided, whereas when a purchaser wishes to purchase vehicle 1 including power receiving device 12 as an option, power receiving device 12 is attached to vehicle 8, thereby providing the purchaser with vehicle 1 in a short time. Particularly, since the operation of attaching power receiving device 12 can be performed readily as described above, even dealers of the vehicle can perform the operation of attaching, whereby the user's request can be handled promptly. On the other hand, also when the user of vehicle 8 wishes to add power receiving device 12 after the purchase thereof, power receiving device 12 can be mounted thereon readily.

Moreover, for maintenance of power receiving device 12 in vehicle 1, power receiving device 12 may need to be detached. Even in such a case, power receiving device 12 can be detached readily by detaching power receiving device 12 and cables 45, 46 (power lines 36, 57) from vehicle 1 shown in FIG. 3 and connecting cable 65 to the first connector 35 and the second connector 29. Furthermore, even the vehicle from which power receiving device 12 has been detached can be charged using charging device 11 by connecting cable 65 to the first connector 35 and the second connector 29.

Thus, according to the plug-in vehicle according to the present embodiment, the purchaser's and user's requests can be handled in a short time.

In FIG. 3, the vehicle may collide with an obstacle (for example, another vehicle) from the left side surface 5 side. In such a case, inlet 30 and cable 44 may be damaged.

On the other hand, cable 46 is disposed to extend at the right side surface 6 side relative to battery case 27. Moreover, power receiving device 12 is disposed on the lower surface of battery case 27 with a space from left side surface 5. Accordingly, even if the obstacle collides with left side surface 5 as described above, cable 46 and power receiving device 12 are suppressed from being damaged. Accordingly, even when it is difficult to charge battery 26 using charging device 11, battery 26 can be charged using power receiving device 12.

Second Embodiment

Figure 6:
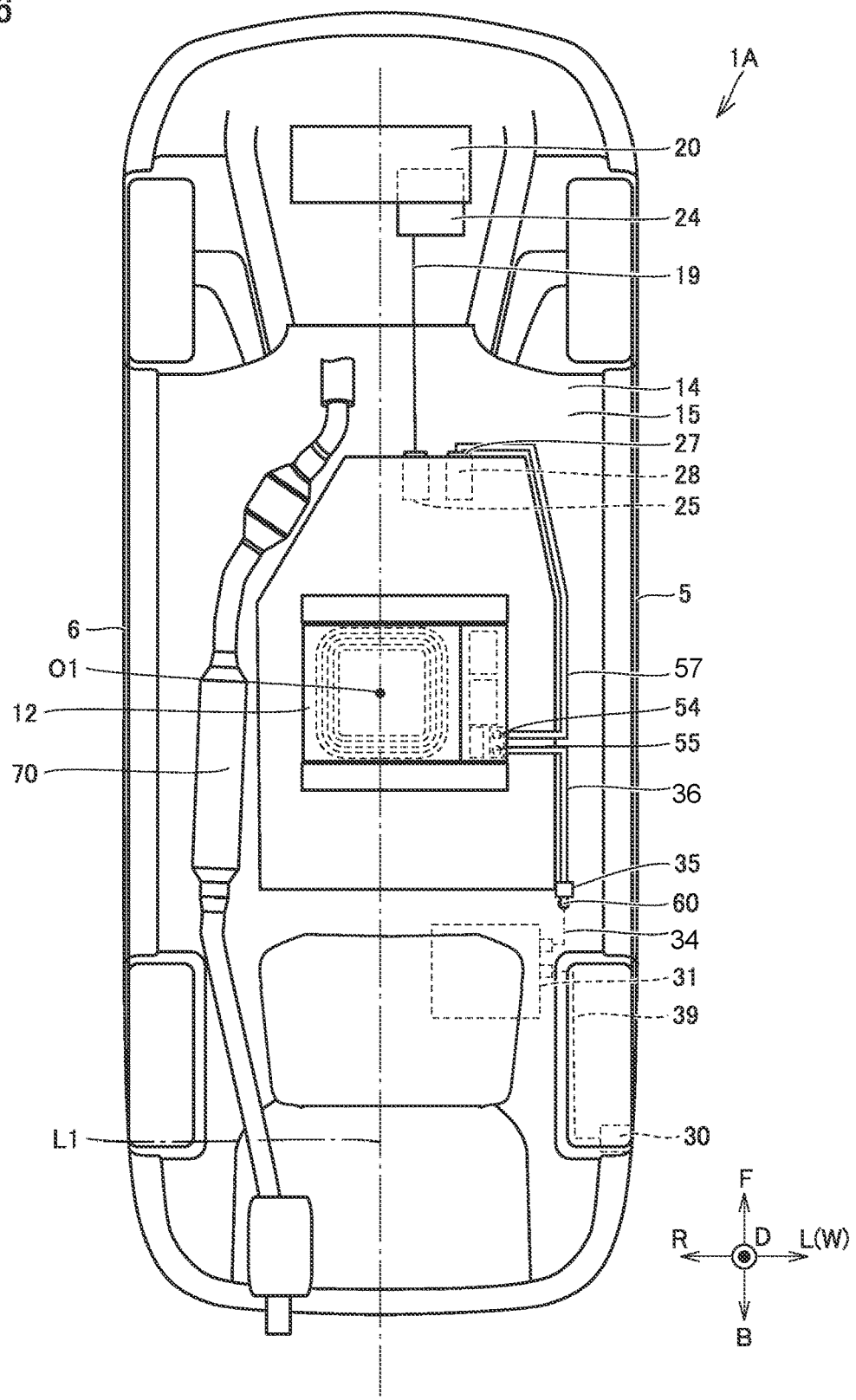
FIG. 6 is a bottom view showing a vehicle 1A according to a second embodiment of vehicle 1.

FIG. 6 is a bottom view showing a vehicle 1A according to a second embodiment. As shown in this FIG. 6, in vehicle 1A, connection terminals 54, 55 are disposed on a side surface of circumferential surfaces of power receiving device 12 at the left side surface 5 side. Hole 60 and the first connector 35 are formed at a location close to left side surface 5 relative to right side surface 6.

Cable 45 (power line 36) is drawn from hole 60, extends at the left side surface 5 side relative to battery case 27, and is connected to connection terminal 55. Cable 46 (power line 57) is also drawn from connection terminal 54 to the left side surface 5 side, extends at the left side surface 5 side relative to battery case 27, and is connected to connector 29. Exhaust pipe 70 is disposed at the right side surface 6 side relative to battery case 27.

Thus, battery case 27 is disposed between exhaust pipe 70 and each of connection terminals 54, 55, thereby suppressing heat of exhaust pipe 70 from reaching connection terminals 54, 55. Moreover, battery case 27 is disposed between exhaust pipe 70 and each of power line 36 and power line 57, thereby suppressing heat of exhaust pipe 70 from reaching power line 36 and power line 57.

Since the heat from exhaust pipe 70 is unlikely to reach connection terminals 54, 55 and power lines 36, 57, connection terminals 54, 55 and power lines 36, 57 can be suppressed from being deteriorated.

It should be noted that as with vehicle 1, also in vehicle 1A, power receiving device 12 can be readily attached and detached.

Third Embodiment

Figure 7:
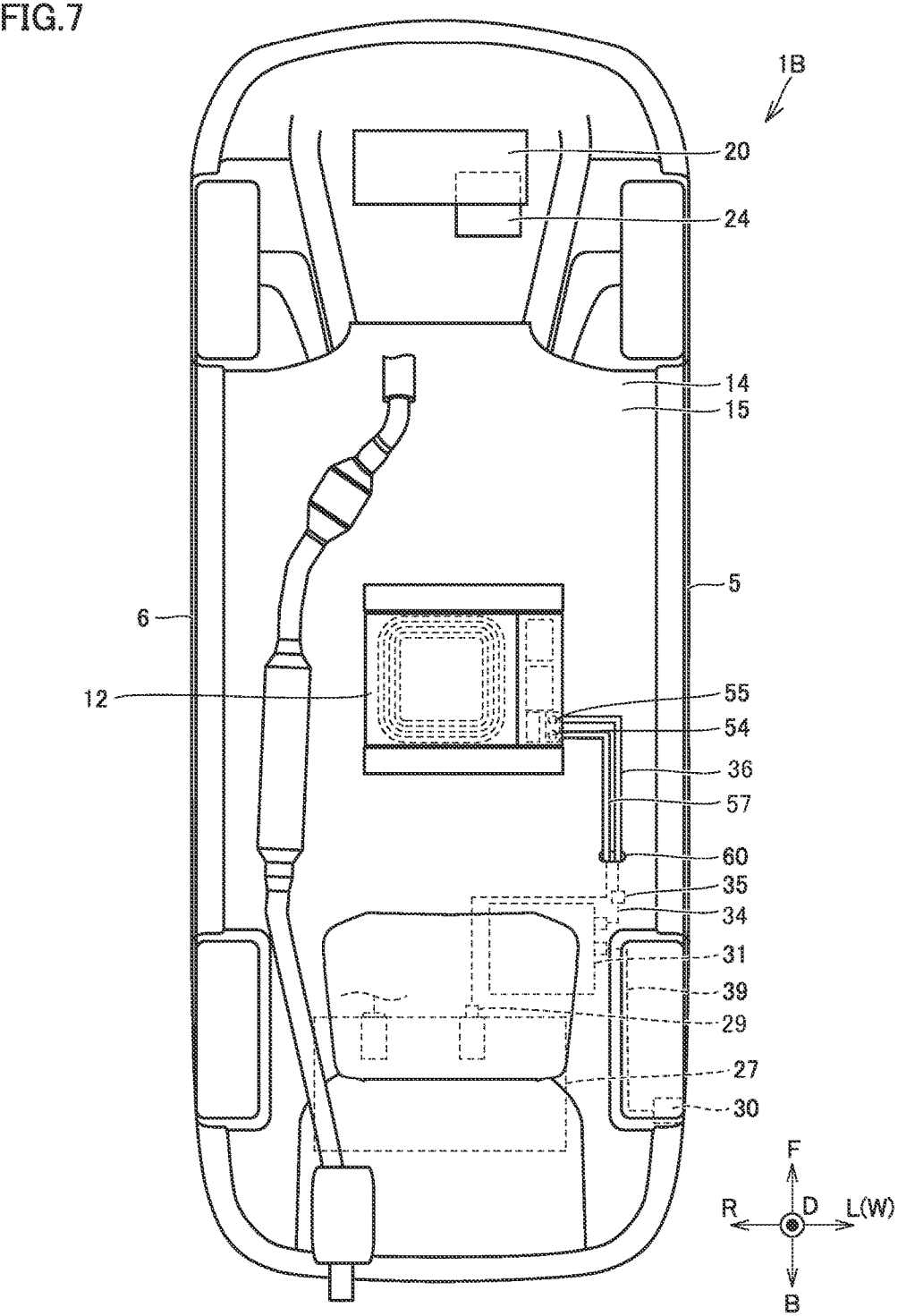
FIG. 7 is a bottom view showing a vehicle 1B according to a third embodiment of vehicle 1.
Figure 8:
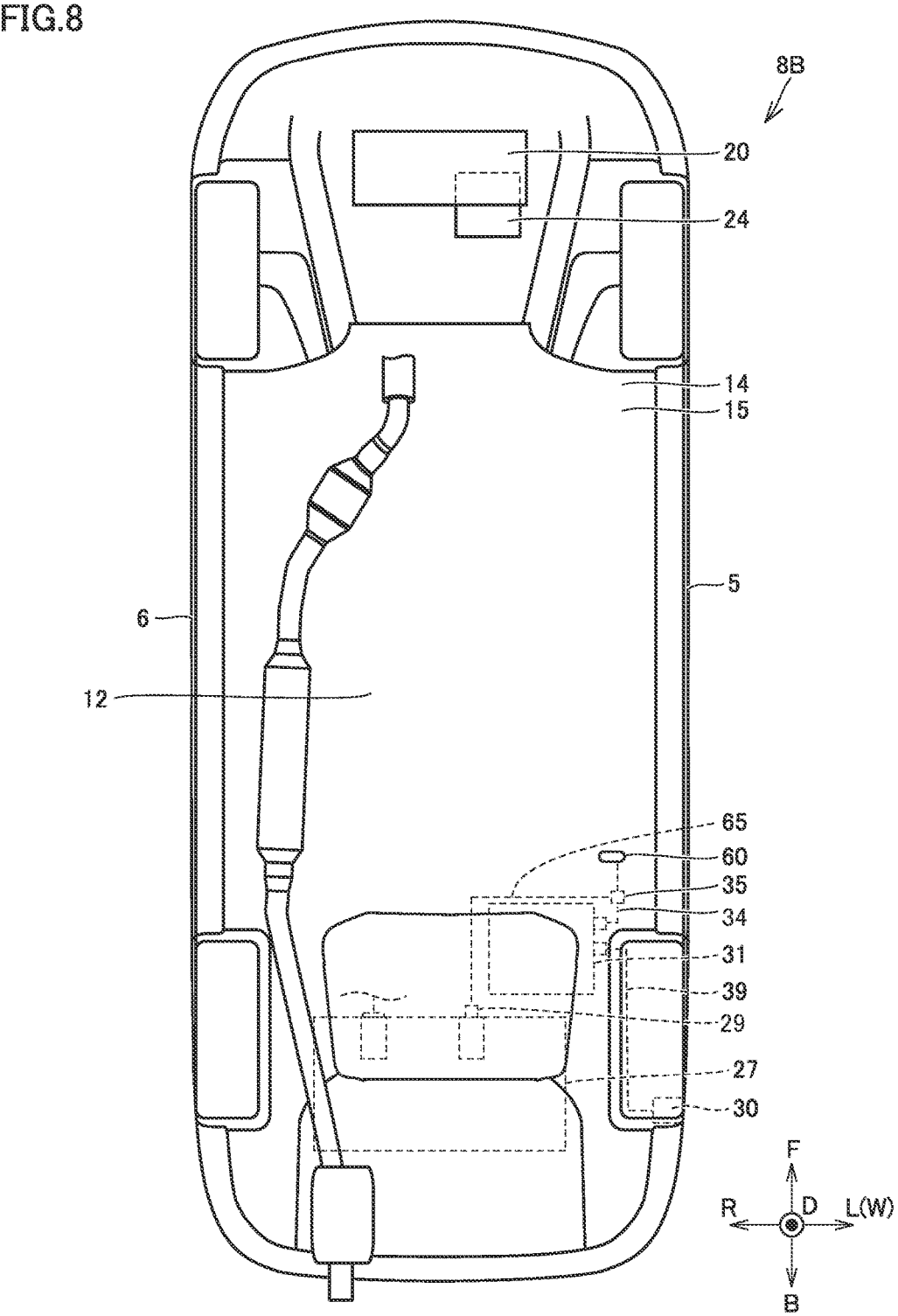
FIG. 8 is a bottom view showing a vehicle 8B in such a state that power receiving device 12 and the like are detached from vehicle 1B.

FIG. 7 is a bottom view showing a vehicle 1B according to a third embodiment of vehicle 1. In vehicle 1B shown in this FIG. 7, battery case 27 and the first connector 35 are disposed inside vehicle 1B.

Cable 45 (power line 36) is drawn to the bottom surface 15 side via hole 60 and is connected to connection terminal 55. Cable 46 (power line 57) connected to connection terminal 54 is drawn into vehicle 1B via hole 60. Cable 46 is connected to the second connector 29.

Also in this vehicle 1B, power receiving device 12 can be detached readily. Specifically, power receiving device 12, cable 44, and cable 45 are detached, and the first connector 35 and the second connector 29 are connected by cable 65. Accordingly, a plug-in vehicle having no power receiving device 12 mounted thereon and capable of charging battery 26 using charging device 11 can be constructed, such as vehicle 8B shown in FIG. 8. It should be noted that a member for closing hole 60 is fitted in hole 60.

Thus, it is not essential to configure such that battery case 27 is disposed on bottom surface 15 of the plug-in vehicle.

It should be noted that in each of the above-described first to third embodiments, it has been illustrated that as charging device 11, the AC charging device configured to receive AC power from outside is employed; however, as charging device 11, a DC charging device configured to receive DC power from outside may be employed. When such a DC charging device is employed, rectifier 31 shown in FIG. 2 is not provided, and a transformer is provided instead of rectifier 31. When rectifier 31 is not provided, the first connector 35 electrically connects inlet 30 and connection terminal 55 directly. When the transformer is disposed, the first connector 35 is connected to inlet 30 via the transformer.

Although the embodiments of the present disclosure have been described, the embodiments disclosed herein are illustrative and non-restrictive in any respect. The scope of the present disclosure is defined by the terms of the claims, and is intended to include any modifications within the scope and meaning equivalent to the terms of the claims.

The invention claimed is:

1. A vehicle comprising:
a battery;
an inlet to which a charging connector provided external to the vehicle is connectable;
a power receiving device configured to contactlessly receive power from a power transmitting device provided external to the vehicle;
a first connector electrically connected to the inlet and the power receiving device; and
a second connector electrically connected to the power receiving device and the battery,
wherein the inlet is directly coupled to an input of a rectifier, an output of the rectifier is directly coupled to the first connector, the first connector is directly coupled to an input terminal of the power receiving device, and an output terminal of the power receiving device is directly coupled to the second connector.

2. The vehicle according to claim 1, further comprising:
a first side surface and a second side surface;
a bottom surface; and
a charging cable configured to electrically connect the second connector and the power receiving device, wherein
the battery is provided on the bottom surface,
the inlet is provided in the first side surface, and
the charging cable is disposed to extend at the second side surface side relative to the battery.

3. The vehicle according to claim 1, further comprising:
a first side surface and a second side surface;
a bottom surface;
an engine; and
an exhaust pipe connected to the engine, wherein
the battery is provided on the bottom surface and the power receiving device is provided on a lower surface of the battery,
the input terminal and the output terminal are provided on a circumferential surface of the power receiving device at a portion located at the first side surface side, and the exhaust pipe is disposed at the second side surface side relative to the battery.

4. The vehicle according to claim 1, further comprising a bottom surface, a first buffer member, and a second buffer member, wherein
the battery is provided on the bottom surface,
the power receiving device is provided on a lower surface of the battery,
the first buffer member and the second buffer member are disposed on the lower surface of the battery, and
the first buffer member is disposed at a front side relative to the power receiving device and the second buffer member is disposed at a back side relative to the power receiving device.

* * * * *